(12) United States Patent
Bito (10) Patent No.: US 9,346,368 B2
(45) Date of Patent: May 24, 2016

(54) MOTOR VEHICLE CHARGING INLET STRUCTURE

(71) Applicant: MITSUBISHI JIDOSHA KOGYO KABUSHIKI KAISHA, Tokyo (JP)

(72) Inventor: Terutoshi Bito, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/514,058

(22) Filed: Oct. 14, 2014

(65) Prior Publication Data

US 2015/0104961 A1    Apr. 16, 2015

(30) Foreign Application Priority Data

Oct. 16, 2013  (JP) ................................. 2013-215823

(51) Int. Cl.
*H01R 13/44* (2006.01)
*B60L 11/18* (2006.01)

(52) U.S. Cl.
CPC .......... *B60L 11/1818* (2013.01); *B60L 2270/34* (2013.01)

(58) Field of Classification Search
CPC .............. B60L 11/1818; H01R 13/447; H01R 13/5213
USPC ......... 439/142, 352, 304, 347, 138, 122, 144, 439/104, 838, 331
See application file for complete search history.

(56) References Cited

U.S. PATENT DOCUMENTS

| 5,934,918 | A  | * | 8/1999 | Wuechner | ........... | B60L 11/1818 439/133 |
| 8,262,402 | B2 | * | 9/2012 | Gaul | ................... | B60L 11/1825 320/109 |
| 8,357,002 | B2 | * | 1/2013 | Katagiri | .................. | B60L 11/14 285/82 |

(Continued)

FOREIGN PATENT DOCUMENTS

| CN | 103872519 A | * | 6/2014 | ......... H01R 13/6397 |
| DE | 102007002025 A1 | | 7/2008 | |
| JP | 2009/081917 A | | 4/2009 | |

(Continued)

*Primary Examiner* — Amy Cohen Johnson
*Assistant Examiner* — Milagros Jeancharles
(74) *Attorney, Agent, or Firm* — Birch, Stewart, Kolasch & Birch, LLP (57) ABSTRACT

A motor vehicle charging inlet structure includes: a first charging socket disposed in a recess portion of a vehicle body and connected to an electricity storage unit of a motor vehicle, the first charging socket being configured to be connected to a charging connector which supplies electric power from an external power supply to the electricity storage unit; a lid configured to open and close the recess portion; and a lock member configured to, when the lid is closed, come into engagement with the lid to fix the lid in a closed state and configured to, when the charging connector is connected to the first charging socket in a state in which the engagement of the lock member with the lid is released, come into press-contact with the charging connector to fix the charging connector in a connected state.

8 Claims, 8 Drawing Sheets

(56) References Cited

U.S. PATENT DOCUMENTS

| | | | |
|---|---|---|---|
| 8,376,768 B2* | 2/2013 | Kurumizawa | B60L 11/14 439/304 |
| 8,616,909 B2* | 12/2013 | Kurumizawa | E05B 83/00 320/109 |
| 8,951,060 B2* | 2/2015 | Meyer-Ebeling | H01R 13/639 320/109 |
| 9,088,104 B2* | 7/2015 | Kahara | H01R 13/6397 |
| 2011/0300728 A1* | 12/2011 | Katagiri | B60L 11/14 439/147 |
| 2012/0043935 A1 | 2/2012 | Dyer et al. | |
| 2012/0234061 A1* | 9/2012 | Inoue | G07C 9/00182 70/255 |
| 2013/0020993 A1 | 1/2013 | Taddeo et al. | |
| 2015/0191093 A1* | 7/2015 | Yamamaru | B60L 11/14 320/109 |

FOREIGN PATENT DOCUMENTS

| | | |
|---|---|---|
| JP | 2011-240753 A | 12/2011 |
| JP | 2011-256576 A | 12/2011 |

* cited by examiner

MOTOR VEHICLE CHARGING INLET STRUCTURE

CROSS-REFERENCE TO RELATED APPLICATION(S)

This application claims the benefit of Japanese Patent Application No. 2013-215823, filed on Oct. 16, 2013, in the Japan Patent Office, the disclosure of which is incorporated herein in its entirety by reference.

TECHNICAL FIELD

The present disclosure relates to a motor vehicle charging inlet structure in which a portion provided with a charging plug is opened and closed by a lid.

BACKGROUND

An electric vehicle driven by an electric motor and a hybrid vehicle driven by the combined use of an electric motor and an engine have been developed in many different forms. An electricity storage unit such as a battery or the like is installed in the electric vehicle or the hybrid vehicle, so that the electric motor is operated by the electric power stored in the electricity storage unit. The electricity storage unit mounted to the electric vehicle or the hybrid vehicle is charged by the electric power supplied from a charging facility outside the motor vehicle, for example, a household commercial power supply or a power supply of a dedicated charging facility.

The charging of the electricity storage unit is implemented by supplying the electric power from a charging connector (charging gun) to the electricity storage unit through a charging socket. Thus, an opening portion (recess portion) of a charging inlet (power-feeding charging inlet) is formed in the vehicle body and a charging socket is disposed in the opening portion, so that a charging opening portion is formed. The charging opening portion is opened or closed by a lid. By virtue of the opening or closing of the lid, the charging inlet is opened or shielded with respect to the outside.

The lid is fixed (locked) in a closed state by, e.g., activating an electromagnetic actuator and causing a lid lock pin to make a closing operation. The lid is unlocked by activating the electromagnetic actuator through an operation in a vehicle room and causing the lid lock pin to make an opening operation. This makes it possible to open the lid.

The electricity storage unit of the electric vehicle or the hybrid vehicle is charged by connecting a charging gun to the charging socket with the charging opening portion kept opened. Since the charging of the electricity storage unit of the electric vehicle or the hybrid vehicle is more time-consuming than the refueling of a gasoline-powered vehicle, there may be a case where the vehicle is left alone in a charging state. Thus, there is a fear that the charging gun is removed from the charging socket and further that the charging gun and the electric power are stolen. Furthermore, there is a possibility that that the charging gun is removed from the charging socket and further that the live part of the charging inlet is exposed.

Under the circumstances, there has been conventionally proposed a lock device that fixes (locks) the charging gun in a connected state when the charging gun is connected to the charging socket. In some techniques, when a charging gun is connected and fixed to a charging socket through the use of a locking claw, the position of the locking claw is restrained by a lock pin, thereby restraining the movement of the locking claw and inhibiting the removal of the charging gun.

In the above techniques, the lid lock pin for fixing the lid and the lock pin for restraining the position of the locking claw of the charging gun to inhibit the removal of the charging gun are driven by one actuator. Thus, the locking of the lid and the locking of the charging gun can be performed by one actuator.

However, since the lid lock pin for locking the lid and the lock pin for locking the charging gun are disposed in a charging inlet (power-feeding charging inlet), it is the current situation that there is a limit in making the charging inlet small.

SUMMARY

Some embodiments of the present disclosure provide a motor vehicle charging inlet structure capable of locking both a lid and a charging connector with one lock member.

According to an aspect of the present disclosure, there is provided a motor vehicle charging inlet structure including: a first charging socket disposed in a recess portion of a vehicle body and connected to an electricity storage unit of a motor vehicle, the first charging socket being configured to be connected to a charging connector which supplies electric power from an external power supply to the electricity storage unit; a lid configured to open and close the recess portion; and a lock member configured to, when the lid is closed, come into engagement with the lid to fix the lid in a closed state and configured to, when the charging connector is connected to the first charging socket in a state in which the engagement of the lock member with the lid is released, come into press-contact with the charging connector to fix the charging connector in a connected state.

In some embodiments, the lock member includes a lock pin which is axially reciprocated by an actuator, when the lock pin is driven in one direction, one end portion of the lock pin engages with the lid, and when the lock pin is driven in another direction, the other end portion of the lock pin comes into press-contact with the charging connector.

In other embodiments, the lock member includes a lock pin which is driven by an actuator so as to rotate about a rotation center, when one end portion of the lock pin is oriented toward an upper side of the motor vehicle, the lock pin engages with the lid, and when the lock pin is rotated such that the one end portion of the lock pin is oriented toward a lower side of the motor vehicle, the lock pin comes into press-contact with the charging connector.

In alternate embodiments, the charging inlet structure further includes: a second charging socket disposed in the recess portion of the vehicle body and connected to the electricity storage unit, the second charging socket being larger in diameter than the first charging socket, and wherein the first and second charging sockets are arranged side by side along one direction and the lock member is disposed in a space which adjoins the first charging socket, the space overlapping with the second charging socket in an arrangement direction of the first and second charging sockets.

In other embodiments, an amount of electric power input to the second charging socket is larger than an amount of electric power input to the first charging socket.

In some other embodiments, a lock member engaging portion with which the lock member engages is formed in the lid, and the lock member engaging portion includes a part holding portion configured to hold a part of the charging inlet structure when the lid is opened.

BRIEF DESCRIPTION OF THE DRAWINGS

The accompanying drawings, which are incorporated in and constitute a part of the specification, illustrate embodiments of the present disclosure, and together with the general description given above and the detailed description of the embodiments given below, serve to explain the principles of the present disclosure.

DETAILED DESCRIPTION

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

A configuration of a motor vehicle charging inlet structure will be described in detail with reference to FIGS. 1 to 4.

Figure 1:
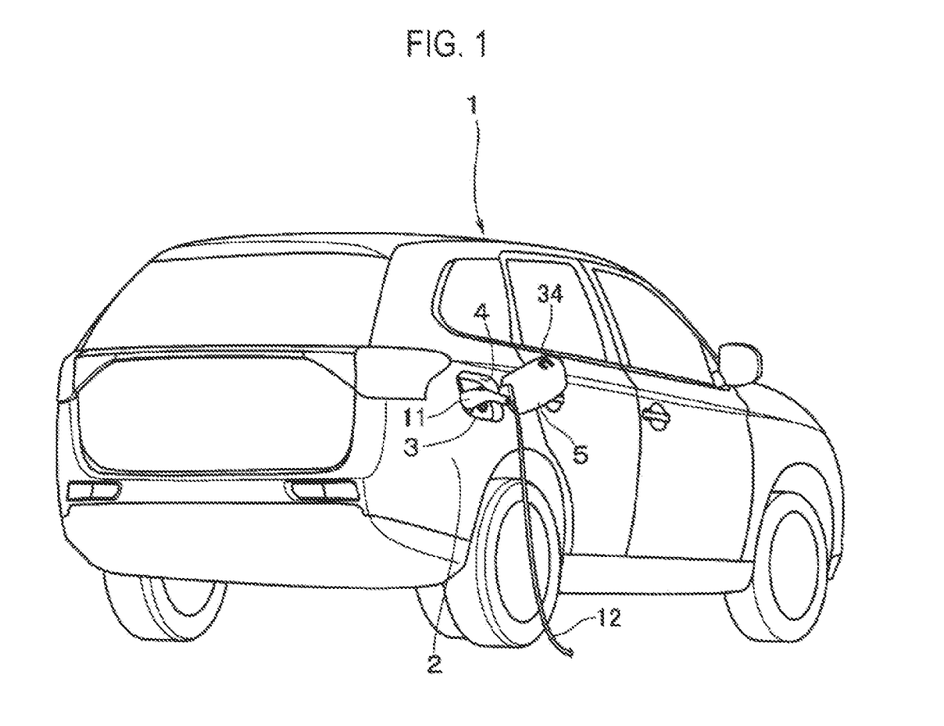
FIG. 1 is an external view of a motor vehicle provided with a motor vehicle charging inlet structure according to one embodiment of the present disclosure.
Figure 2:
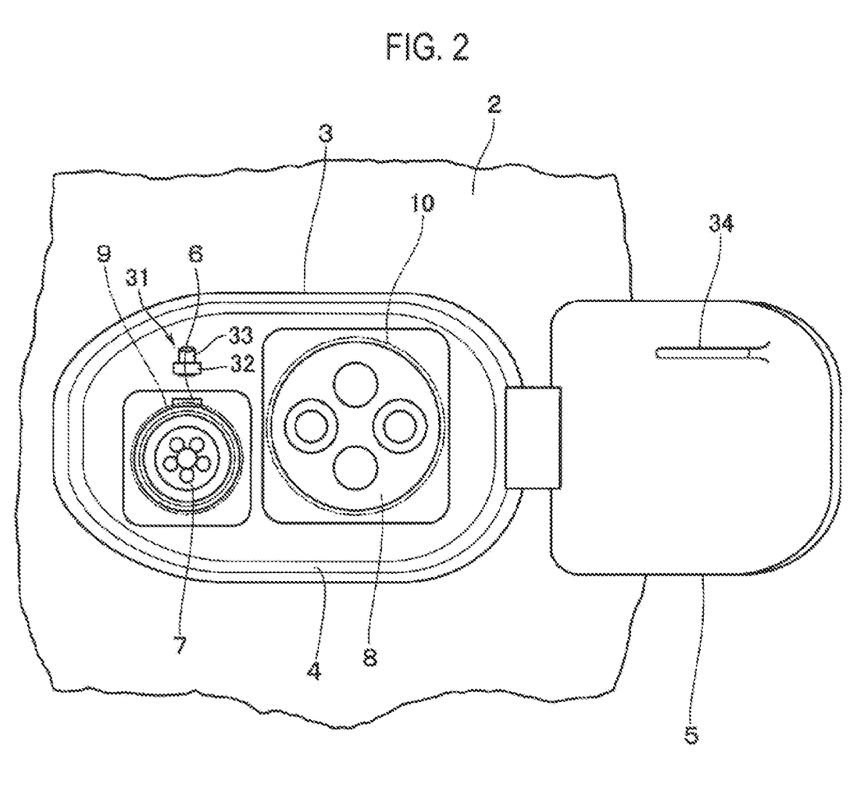
FIG. 2 is an explanatory view showing a specific configuration of a charging inlet.
Figure 3A:
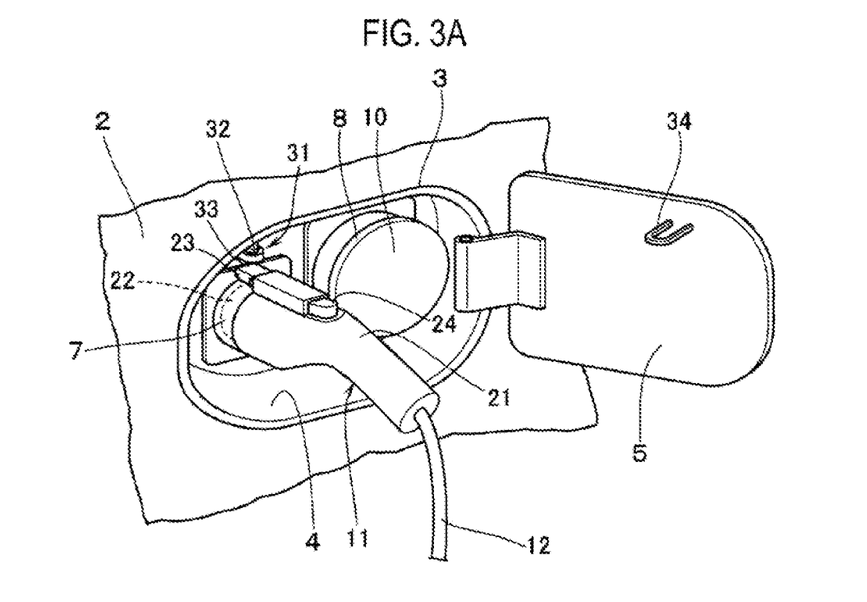
FIGS. 3A and 3B are explanatory views showing the specific configuration of the charging inlet.
Figure 3B:
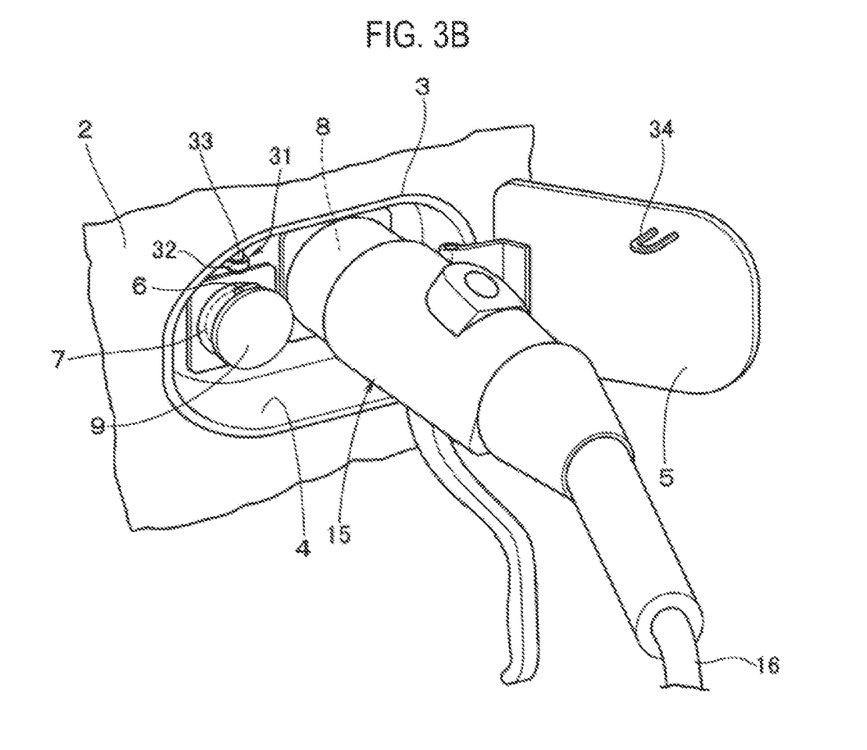
Figure 4:
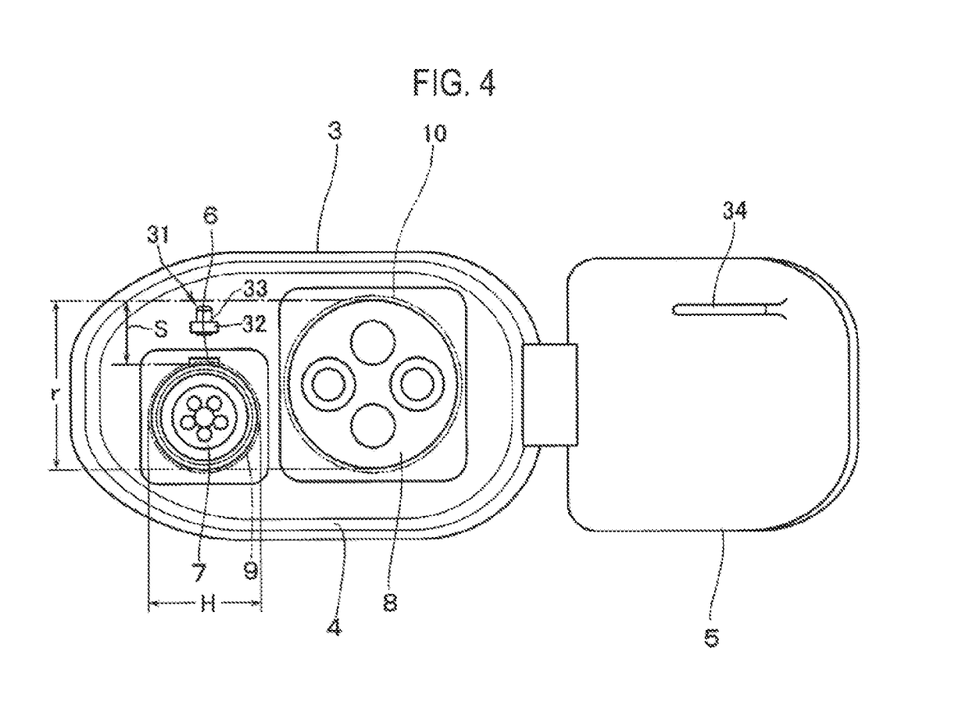
FIG. 4 is a front view of the charging inlet.

FIG. 1 shows the overall external appearance of a motor vehicle provided with a motor vehicle charging inlet structure (a power-feeding charging inlet structure) according to one embodiment of the present disclosure. FIGS. 2, 3A and 3B show a specific configuration of a charging inlet. FIG. 2 shows a state in which a charging connector is not inserted. FIG. 3A shows a state in which an ordinary charging connector connected to a household commercial power supply is inserted into an ordinary charging socket. FIG. 3B shows a state in which a rapid charging connector connected to a rapid charging power supply such as a charging stand or the like is inserted into a rapid charging socket. FIG. 4 is a front view of the charging inlet, explaining the arrangement of the ordinary charging socket and the rapid charging socket.

As shown in FIG. 1, an opening portion 3 is formed in a rear side outer panel (an outer panel) 2 of a motor vehicle 1. A recess portion 4 is formed inside the opening portion 3. A lid 5 is openably installed in the opening portion 3 of the outer panel 2. By opening the lid 5, the recess portion 4 faces toward the outside.

As shown in FIGS. 2 to 4, the recess portion 4 has a shape of a container which includes a rectangular bottom surface and a wall surface existing around the bottom surface. An ordinary charging socket 7 as a first socket and a rapid charging socket 8 as a second socket are installed side by side on the bottom surface. The ordinary charging socket 7 and the rapid charging socket 8 are connected to an electricity storage unit of the motor vehicle 1.

As shown in FIG. 3B, when not in use, the ordinary charging socket 7 is capped with a cap 9. During a charging process, as shown in FIG. 3A, the cap 9 is removed and an ordinary charging connector 11 (an ordinary charging gun) is inserted into the ordinary charging socket 7. The ordinary charging connector 11 is installed at one end side of a low-voltage cable 12. The other end side of the low-voltage cable 12 is connected to a household power supply (a household outlet). Thus, the electric power of a low voltage is fed to the ordinary charging socket 7 through the ordinary charging connector 11.

The ordinary charging connector 11 includes a grip portion 21 and a cylindrical mounting portion 22. The mounting portion 22 is inserted into the ordinary charging socket 7 such that connection terminals are connected to each other. A locking claw 23 is installed on the outer circumference of the mounting portion 22. When the mounting portion 22 is inserted into the ordinary charging socket 7, the locking claw 23 is locked to a locking portion 6 of the ordinary charging socket 7. Thus, the detachment of the ordinary charging connector 11 is prevented.

The base end side of the locking claw 23 extends toward the grip portion 21. An operation portion 24 is provided at the base end side of the locking claw 23. The base end side of the locking claw 23 is rotatably supported on the body of the ordinary charging connector 11. The locking claw 23 is rotationally biased toward the mounting portion 22. By operating the operation portion 24 to rotate the locking claw 23 against a biasing force toward the opposite side of the mounting portion 22, it is possible to unlock the locking claw 23 from the locking portion 6 of the ordinary charging socket 7.

As shown in FIG. 3A, when not in use, the rapid charging socket 8 is capped with a cap 10. During a charging process, as shown in FIG. 3B, the cap 10 is removed and a rapid charging connector 15 (a rapid charging gun) is inserted into the rapid charging socket 8. The rapid charging connector 15 is installed at one end of a high-voltage cable 16. The other end of the high-voltage cable 16 is connected to a vehicle-dedicated charging device in a dedicated charging facility. The vehicle-dedicated charging device is, e.g., a device that converts a three-phase high AC voltage to a DC voltage and outputs the DC voltage. Thus, high voltage electric power is fed to the rapid charging socket 8 through the rapid charging connector 15.

The charging inlet structure of the present embodiment may include the rapid charging socket 8 capable of charging a motor vehicle with a large amount of electric power supplied from a dedicated charging facility (the rapid charging socket 8 to which the rapid charging connector 15 extending from a facility capable of rapidly charging a motor vehicle at a high voltage is connected) and the ordinary charging socket 7 capable of charging a motor vehicle with household commercial electric power (the ordinary charging socket 7 to which the ordinary charging connector 11 extending from a low-voltage household outlet is connected).

No description will be made on the specific configuration of the rapid charging connector 15.

As shown in FIGS. 2 to 4, a lock mechanism 31 is installed above the ordinary charging socket 7. The lock mechanism 31 is provided with a lock pin 33 (a lock member) which is vertically reciprocated by the actuation of an electromagnetic actuator 32. At the rear surface side of the lid 5, there is installed a hook portion 34 (a lock member engaging portion) with which the upper end portion (one end side) of the lock pin 33 engages when the lid 5 is closed.

As will be described in detail later, when the lid 5 is closed, the lock pin 33 is driven upward to thereby come into engagement with the hook portion 34. Thus, the lid 5 is locked in the closed state and cannot be opened.

When the ordinary charging connector 11 is inserted into the ordinary charging socket 7 and the locking claw 23 is locked to the locking portion 6 of the ordinary charging socket 7, the lock pin 33 is driven downward whereby the locking claw 23 is pressed by the lower end (the other end side) of the lock pin 33. That is to say, the other end side of the lock pin 33 comes into press-contact with the locking claw 23 (the charging connector side). Consequently, the locking of the locking claw 23 to the locking portion 6 is maintained and the state of insertion of the ordinary charging connector 11 into the ordinary charging socket 7 is locked. In this state, the ordinary charging connector 11 cannot be removed.

In a case where charging is performed by inserting the ordinary charging connector 11 into the ordinary charging socket 7, the ordinary charging connector 11 is inserted into the ordinary charging socket 7 with the lid 5 kept opened. Since the ordinary charging connector 11 is connected to, e.g., a household power supply (a household outlet), a long period of time is required in charging a motor vehicle. Therefore, there may be a case where the motor vehicle is left alone in a charging state.

In the present embodiment, the state of insertion of the ordinary charging connector 11 into the ordinary charging socket 7 is locked by the lock pin 33 of the lock mechanism 31, in which state the ordinary charging connector 11 cannot be removed. Thus, there is no possibility that the ordinary charging connector 11 or the electric power is stolen. Furthermore, the live part of the charging inlet is not exposed. This eliminates the possibility that a user or the like inadvertently touches the live part.

As shown in FIG. 4, the ordinary charging socket 7 and the rapid charging socket 8 are installed side by side in the front-rear direction of the motor vehicle (in the left-right direction in FIG. 4: in one direction). The rapid charging socket 8 is larger in diameter than the ordinary charging socket 7. The lower outer peripheral edges of the ordinary charging socket 7 and the rapid charging socket 8 are aligned with each other along the front-rear direction of the motor vehicle. That is to say, the ordinary charging socket 7 and the rapid charging socket 8 are installed side by side along one direction in such a state that the lower edges thereof are aligned with each other at the same height position (in such a state that the outer peripheral edges thereof are aligned with each other along the arrangement direction).

The lock mechanism 31 is installed above the ordinary charging socket 7. That is to say, the lock mechanism 31 (the lock pin 33) is installed in a space S overlapping with the diameter r of the rapid charging socket 8 over a range H of the ordinary charging socket 7 extending in the front-rear direction of the motor vehicle (in the left-right direction in FIG. 4: in the arrangement direction). Therefore, there is no need to have a dedicated space for the arrangement of the lock mechanism 31 (the lock pin 33). This makes it possible to effectively use the available space when the ordinary charging socket 7 and the rapid charging socket 8 (which differ in diameter from each other) are provided.

The ordinary charging socket 7 and the rapid charging socket 8 may be installed side by side in the up-down direction of the motor vehicle rather than in the front-rear direction of the motor vehicle. In this case, the lock mechanism 31 is installed in a position adjoining one of the left and right side of the ordinary charging socket 7 and in a space overlapping with the diameter r of the rapid charging socket 8 in the up-down direction.

The operation of the motor vehicle charging inlet structure will be described in detail with reference to FIGS. 5, 6A and 6B.

Figure 5:
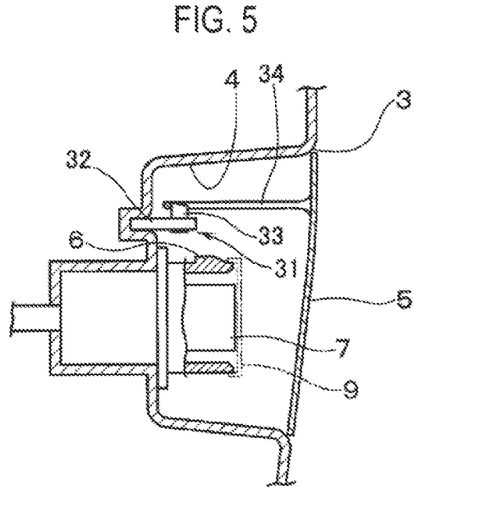
FIG. 5 is an explanatory view illustrating the operation of the motor vehicle charging inlet structure.

FIG. 5 shows a cross section with the lid closed. FIGS. 6A and 6B show a cross section with the lid opened. FIG. 6A illustrates a state in which the ordinary charging connector 11 is not inserted. FIG. 6B illustrates a state in which the ordinary charging connector 11 is locked.

As shown in FIG. 5, when the lid 5 is closed, the lock pin 33 is driven upward by the electromagnetic actuator 32, thereby bringing the upper end portion of the lock pin 33 into engagement with the hook portion 34. Thus, the lid 5 is locked in a closed state. In this state, the lid 5 cannot be opened from the outside.

Figure 6A:
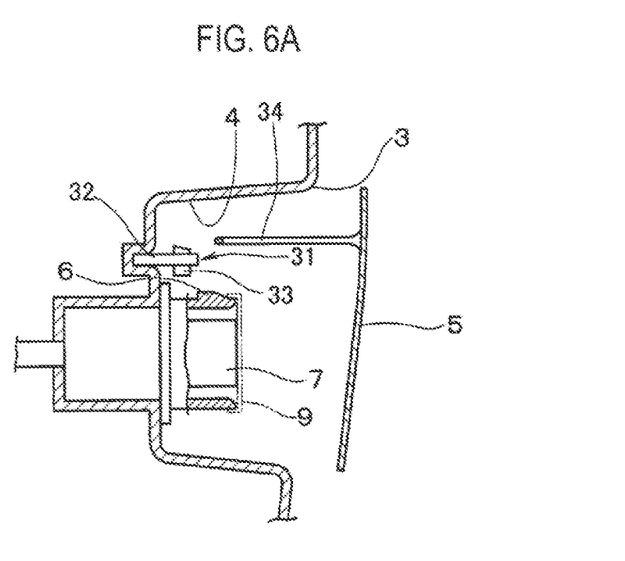
FIGS. 6A and 6B are explanatory views illustrating the operation of the motor vehicle charging inlet structure.

When opening the lid 5, as shown in FIG. 6A, the lock pin 33 is driven toward a neutral position by the electromagnetic actuator 32, thereby releasing the upper end portion of the lock pin 33 from the hook portion 34. Thus, the lid 5 is unlocked and can be opened from the outside.

In a case where the lid 5 is opened and charging is performed using, e.g., the ordinary charging connector 11, the ordinary charging connector 11 is inserted into and connected to the ordinary charging socket 7 in the state shown in FIG. 6A wherein the lock pin 33 is driven into the neutral position. The locking claw 23 of the ordinary charging connector 11 is locked to the locking portion 6 of the ordinary charging socket 7.

Figure 6B:
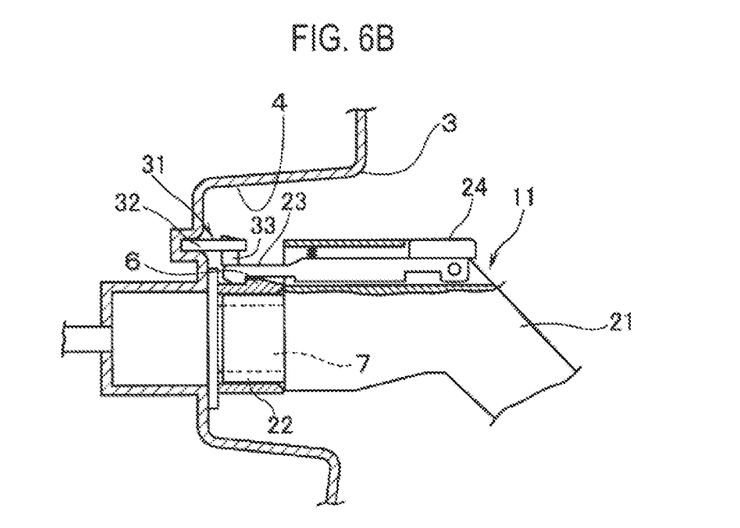

After the ordinary charging connector 11 is inserted into the ordinary charging socket 7, as shown in FIG. 6B, the lock pin 33 is driven downward by the electromagnetic actuator 32, thereby pressing the locking claw 23 of the ordinary charging connector 11 with the lower end portion of the lock pin 33. Thus, the locking of the locking claw 23 to the locking portion 6 is maintained and the state of insertion (connection) of the ordinary charging connector 11 into (to) the ordinary charging socket 7 is locked. In this state, the ordinary charging connector 11 cannot be removed.

Therefore, by axially reciprocating one lock pin 33, it is possible to lock the closed state of the lid 5 and to lock the connection state of the ordinary charging connector 11. Thus, the charging inlet includes a lock mechanism for the lid 5 and the ordinary charging connector 11 can be small in size. This makes it possible to increase the degree of freedom of a vehicle body design.

Another embodiment of the lock member engaging portion will now be described with reference to FIGS. 7A and 7B.

Figure 7A:
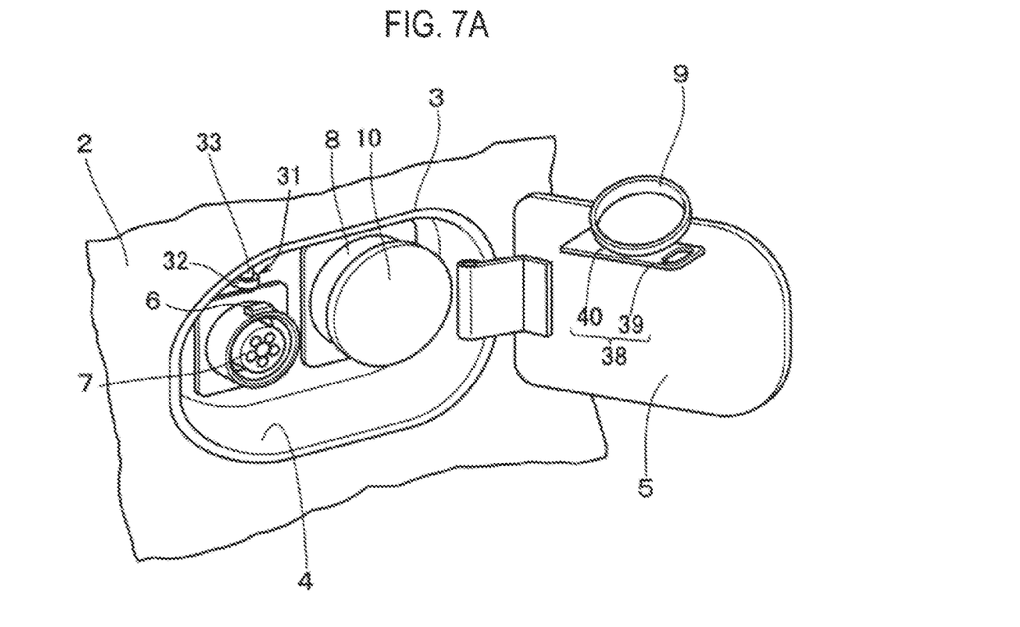
FIGS. 7A and 7B are external views of a lid according to another embodiment of the present disclosure.
Figure 7B:
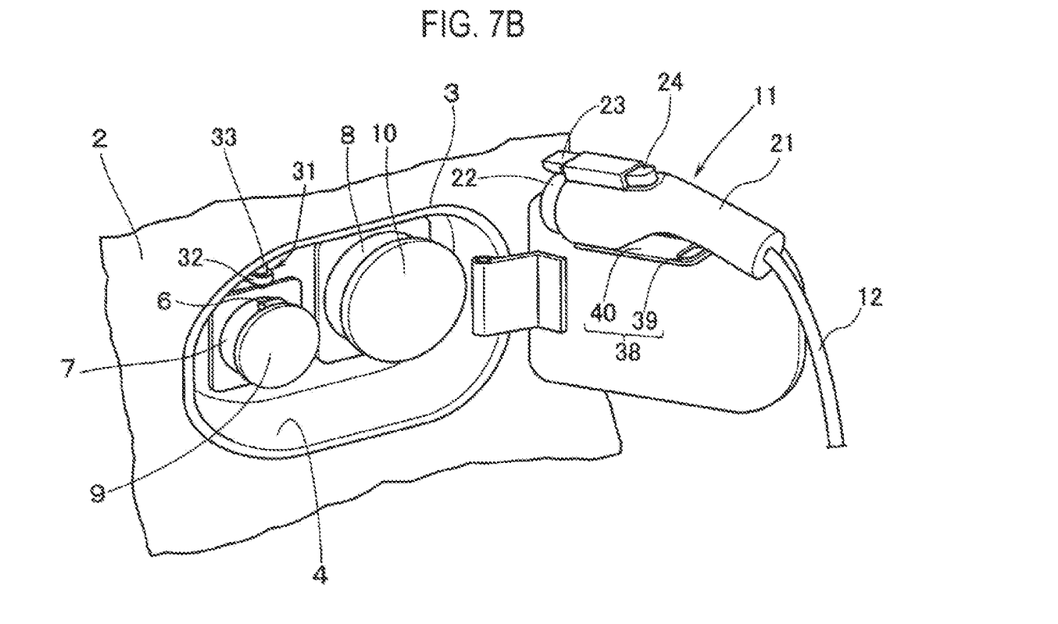

FIGS. 7A and 7B show the external appearance of a lid according to another embodiment of the present disclosure. FIG. 7A shows a state in which a cap is held in a part holding portion. FIG. 7B shows a state in which a charging connector is held in a part holding portion.

As shown in FIGS. 7A and 7B, a lock member engaging portion 38 is installed at the rear surface side of the lid 5. The lock member engaging portion 38 includes a hook portion 39 with which the upper end portion (one end side) of the lock pin 33 engages when the lid 5 is closed and a part holding portion 40 extending in the width direction.

In a case where charging is performed in the ordinary charging socket 7, as shown in FIG. 7A, the cap 9 of the ordinary charging socket 7 is held in the lock member engaging portion 38. While not shown in the drawings, in the case where charging is performed in the rapid charging socket 8, the cap 10 of the rapid charging socket 8 is held in the lock member engaging portion 38.

When the cap 9 of the ordinary charging socket 7 is being removed by opening the lid 5, as shown in FIG. 7B, the ordinary charging connector 11 is held in the lock member engaging portion 38. While not shown in the drawings, when the cap 10 of the rapid charging socket 8 is being removed, the rapid charging connector 15 is held in the lock member engaging portion 38.

Another embodiment of the lock mechanism will now be described with reference to FIG. 8.

Figure 8:
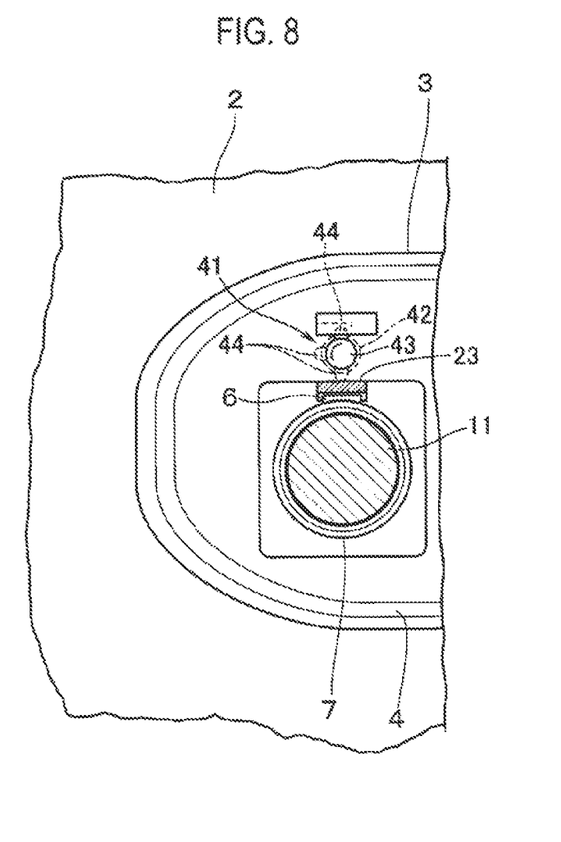
FIG. 8 is a front view of a lock mechanism according to still another embodiment of the present disclosure.

FIG. 8 is a front view of a lock mechanism according to still another embodiment of the present disclosure. The same members as those shown in FIG. 4 will be designated by like reference symbols.

A lock mechanism 41 is installed above the ordinary charging socket 7. The lock mechanism 41 is provided with a rotary actuator 42. The rotary actuator 42 includes a rotating portion 43 that rotates about an axis (a rotation center) perpendicular to a drawing sheet. A lock pin 44 is fixed to the edge portion of the rotating portion 43.

When the lid 5 is closed, if the rotating portion 43 is driven by the rotary actuator 42 such that the lock pin 44 is positioned at the upper side, the lock pin 44 comes into engagement with the hook portion 34. Thus, the lid 5 is locked in the closed state. In order to open the lid 5, the rotating portion 43 is driven by the rotary actuator 42 such that the lock pin 44 is positioned at a lateral side. Then, the lock pin 44 is removed from the hook portion 34. Thus, the lid 5 is unlocked.

If the ordinary charging connector 11 is connected in this state, the locking claw 23 of the ordinary charging connector 11 is locked to the locking portion 6 of the ordinary charging socket 7. If the rotating portion 43 is driven by the rotary actuator 42 such that the lock pin 44 is positioned at the lower side, the lock pin 44 presses the locking claw 23 of the ordinary charging connector 11. Thus, the locking of the locking claw 23 to the locking portion 6 is maintained and the state of insertion (connection) of the ordinary charging connector 11 into (to) the ordinary charging socket 7 is locked.

Therefore, by rotating one lock pin 44, it is possible to lock the closed state of the lid 5 and to lock the connection state of the ordinary charging connector 11. By rotating the lock pin 44 through the use of the rotary actuator 42, it is possible to prevent the lock pin 44 from pressing the locking claw 23 of the ordinary charging connector 11 with an unnecessarily large force.

The present disclosure can be used in the industrial field of a motor vehicle charging inlet structure in which a portion provided with a charging plug is opened and closed by a lid.

According to the present disclosure, the closed state of the lid and the connected state of the charging connector may be fixed by one lock member. It is therefore possible to lock both the lid and the charging gun with one lock member.

As a result, the charging inlet provided with the lock mechanism for the lid and the charging connector can be small in size. This makes it possible to increase the degree of freedom of a vehicle body design.

According to the present disclosure, by axially reciprocating the lock pin, the closed state of the lid can be locked at one end side of the lock pin and the connected state of the charging connector can be locked at the other end side of the lock pin. Therefore, the charging inlet can be made smaller.

According to the present disclosure, the lock pin may be rotated about a rotation center. Therefore, two mutually different locking operations, namely the locking of the lid and the locking of the connected state of the charging connector, can be performed with one lock pin.

According to the present disclosure, the first socket and the second socket having a larger diameter are arranged side by side. The lock member is disposed in, e.g., a space overlapped with the diameter of the second socket in the arrangement direction over a range adjoining the first socket, namely the upper space of the first socket. Therefore, there is no need to secure a dedicated space for the arrangement of the lock member. This makes it possible to effectively use the available space when first and second sockets which differ in diameter from each other are provided.

According to the present disclosure, the motor vehicle charging inlet structure may include a second socket capable of charging a motor vehicle with a large amount of electric power supplied from a dedicated charging facility, e.g., a rapid charging socket to which a charging connector extending from a facility capable of rapidly charging a motor vehicle at a high voltage is connected, and a first socket capable of charging a motor vehicle with household commercial electric power, e.g., an ordinary charging socket to which a charging connector extending from a low-voltage household outlet is connected. The lock member is installed in a position adjoining the ordinary charging socket. It is therefore possible to lock the connection of an ordinary charging connector which requires a long period of time in charging a motor vehicle, thereby preventing the theft of the charging gun and the electric power.

According to the present disclosure, the lock member engaging portion may be formed as part of a holding portion. Therefore, when the lid is opened, the inner lid of the first socket (the second socket) and the charging connector can be held in the lock member engaging portion.

The motor vehicle charging inlet structure of the present disclosure can lock both the lid and the charging connector with one lock member.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A motor vehicle charging inlet structure, comprising:
   a first charging socket disposed in a recess portion of a vehicle body and connected to an electricity storage unit of a motor vehicle, the first charging socket being configured to be connected to a charging connector which supplies electric power from an external power supply to the electricity storage unit;
   a lid configured to open and close the recess portion; and
   a lock member configured to, when the lid is closed, come into engagement with the lid to fix the lid in a closed state and configured to, when the charging connector is connected to the first charging socket in a state in which the engagement of the lock member with the lid is released, come into press-contact with the charging connector to fix the charging connector in a connected state,
   wherein the lock member includes a lock pin which is axially reciprocated by an actuator,
   when the lock pin is driven in one direction, one end portion of the lock pin engages with the lid, and
   when the lock pin is driven in another direction, the other end portion of the lock pin comes into press-contact with the charging connector.

2. The inlet structure of claim 1, further comprising:
   a second charging socket disposed in the recess portion of the vehicle body and connected to the electricity storage unit, the second charging socket being larger in diameter than the first charging socket, and
   wherein the first and second charging sockets are arranged side by side along one direction and the lock member is disposed in a space which adjoins the first charging socket, the space overlapping with the second charging socket in an arrangement direction of the first and second charging sockets.

3. The inlet structure of claim 2, wherein an amount of electric power input to the second charging socket is larger than an amount of electric power input to the first charging socket.

4. The inlet structure of claim 3, wherein a lock member engaging portion with which the lock member engages is formed in the lid, and
the lock member engaging portion includes a part holding portion configured to hold a part of the charging inlet structure when the lid is opened.

5. A motor vehicle charging inlet structure, comprising:
a first charging socket disposed in a recess portion of a vehicle body and connected to an electricity storage unit of a motor vehicle, the first charging socket being configured to be connected to a charging connector which supplies electric power from an external power supply to the electricity storage unit;
a lid configured to open and close the recess portion; and
a lock member configured to, when the lid is closed, come into engagement with the lid to fix the lid in a closed state and configured to, when the charging connector is connected to the first charging socket in a state in which the engagement of the lock member with the lid is released, come into press-contact with the charging connector to fix the charging connector in a connected state,
wherein the lock member includes a lock pin which is driven by an actuator so as to rotate about a rotation center,
when one end portion of the lock pin is oriented toward an upper side of the motor vehicle, the lock pin engages with the lid, and
when the lock pin is rotated such that the one end portion of the lock pin is oriented toward a lower side of the motor vehicle, the lock pin comes into press-contact with the charging connector.

6. The inlet structure of claim 5, further comprising:
a second charging socket disposed in the recess portion of the vehicle body and connected to the electricity storage unit, the second charging socket being larger in diameter than the first charging socket, and
wherein the first and second charging sockets are arranged side by side along one direction and the lock member is disposed in a space which adjoins the first charging socket, the space overlapping with the second charging socket in an arrangement direction of the first and second charging sockets.

7. The inlet structure of claim 6, wherein an amount of electric power input to the second charging socket is larger than an amount of electric power input to the first charging socket.

8. The inlet structure of claim 7, wherein a lock member engaging portion with which the lock member engages is formed in the lid, and
the lock member engaging portion includes a part holding portion configured to hold a part of the charging inlet structure when the lid is opened.

* * * * *